US010960339B2

(12) United States Patent
Cole

(10) Patent No.: US 10,960,339 B2
(45) Date of Patent: *Mar. 30, 2021

(54) METHOD AND SYSTEM FOR REPLACING AN AIR FILTER

(71) Applicant: JPL Investments, LLC, Las Vegas, NV (US)

(72) Inventor: Joseph W. Cole, Las Vegas, NV (US)

(73) Assignee: JPL Investments, LLC, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 16/537,189

(22) Filed: Aug. 9, 2019

(65) Prior Publication Data

US 2019/0358574 A1 Nov. 28, 2019

Related U.S. Application Data

(63) Continuation of application No. 15/431,360, filed on Feb. 13, 2017, now Pat. No. 10,376,827, which is a continuation-in-part of application No. 14/846,257, filed on Sep. 4, 2015, now Pat. No. 10,520,216, which is a continuation-in-part of application No. 14/487,929, filed on Sep. 16, 2014, now Pat. No. 9,127,856.

(60) Provisional application No. 61/907,027, filed on Nov. 21, 2013, provisional application No. 61/887,533, filed on Oct. 7, 2013.

(51) Int. Cl.
*B01D 46/10* (2006.01)
*B01D 46/42* (2006.01)
*B01D 46/00* (2006.01)
*F24F 13/28* (2006.01)

(52) U.S. Cl.
CPC ....... *B01D 46/4227* (2013.01); *B01D 46/008* (2013.01); *B01D 46/0086* (2013.01); *F24F 13/28* (2013.01); *B01D 2279/50* (2013.01)

(58) Field of Classification Search
CPC .............. B01D 46/0006; B01D 46/002; B01D 46/0047; B01D 46/10; Y10S 55/29; Y10S 55/31; Y10S 55/35
USPC .... 55/385.1, 385.2, 481, 486, 506, DIG. 29, 55/DIG. 31, DIG. 35; 454/187, 292, 298, 454/324
See application file for complete search history.

(56) References Cited

U.S. PATENT DOCUMENTS

| 4,979,260 A | 12/1990 | Holsten et al. |
| 5,149,038 A | 9/1992 | VanCleve |

(Continued)

FOREIGN PATENT DOCUMENTS

| JP | 10-196998 | 7/1998 |
| JP | 410339468 | 12/1998 |

OTHER PUBLICATIONS http://www.hayneedle.com/product/racorph1lrheavyliftoverheadgaragestorage.cfm in 4 pages, Copyright 2002-2015.

*Primary Examiner* — Minh Chau T Pham
(74) *Attorney, Agent, or Firm* — Weide & Miller, Ltd.

(57) ABSTRACT

An air filter unit for an air intake of an air handling or HVAC system includes a grate configured to support a plurality of spaced apart filters at a top side thereof, whereby air is drawn through the grate and then sequentially through the filters into the air intake. The air filter unit may include a filter indicator which provides a visual indication of the air filters, such as based upon the pressure differential on either side of the air filters.

9 Claims, 11 Drawing Sheets

(56) References Cited

U.S. PATENT DOCUMENTS

| | | | |
|---|---|---|---|
| 5,281,954 A | 1/1994 | Harrison et al. | |
| 5,429,116 A | 7/1995 | Brown | |
| 5,513,889 A | 5/1996 | Fithen et al. | |
| 5,525,145 A | 6/1996 | Hodge | |
| 5,563,766 A | 10/1996 | Long et al. | |
| 5,679,121 A | 10/1997 | Kim | |
| 5,690,719 A | 11/1997 | Hodge | |
| 5,863,310 A | 1/1999 | Brown et al. | |
| 5,989,303 A | 11/1999 | Hodge | |
| 6,030,427 A | 2/2000 | Sorice et al. | |
| 6,142,439 A | 11/2000 | Aramaki | |
| 6,354,936 B1 | 3/2002 | Noh et al. | |
| 6,379,412 B1 | 4/2002 | Porterfield | |
| 6,446,926 B1 | 9/2002 | Kaschuk | |
| 6,477,758 B2 | 11/2002 | Krebel | |
| 6,507,962 B2 | 1/2003 | Thurston | |
| 6,553,872 B1 | 4/2003 | Tse et al. | |
| 6,554,880 B1 * | 4/2003 | Northcutt | B01D 46/0006 454/292 |
| 6,591,716 B2 | 7/2003 | Wantz | |
| 6,672,636 B2 | 1/2004 | Kelly | |
| 6,716,267 B2 | 4/2004 | Lawlor, Sr. et al. | |
| 6,859,146 B2 | 2/2005 | McGreal et al. | |
| 7,233,254 B2 | 6/2007 | Howell | |
| 7,523,919 B2 | 4/2009 | Hanlon | |
| 7,575,617 B2 | 8/2009 | Ferguson | |
| 7,971,844 B2 | 7/2011 | Newport | |
| 7,993,434 B2 | 8/2011 | Oscar | |
| 8,004,416 B2 | 8/2011 | Bradley, Jr. et al. | |
| 8,057,565 B2 | 11/2011 | Yabu et al. | |
| 8,075,031 B2 | 12/2011 | Walker, Jr. | |
| 8,308,209 B1 | 11/2012 | Bibow et al. | |
| 8,371,547 B2 | 2/2013 | Wilkowske | |
| 8,734,973 B1 | 5/2014 | Arnim | |
| 10,376,827 B2 * | 8/2019 | Cole | F24F 13/28 |
| 10,520,216 B2 * | 12/2019 | Cole | B01D 46/4227 |
| 2002/0079412 A1 | 6/2002 | Pitlor | |
| 2004/0099610 A1 | 5/2004 | Haul | |
| 2006/0065807 A1 | 3/2006 | Hanlon | |
| 2009/0165432 A1 * | 7/2009 | Yabu | F24F 13/28 55/415 |
| 2009/0199526 A1 | 8/2009 | Wallace | |
| 2009/0309743 A1 | 12/2009 | Tollman | |
| 2014/0020561 A1 | 1/2014 | Aery | |
| 2015/0096271 A1 | 4/2015 | Cole | |

* cited by examiner

METHOD AND SYSTEM FOR REPLACING AN AIR FILTER

RELATED APPLICATION DATA

This application is a continuation of Ser. No. 15/431,360, filed Feb. 13, 2017, now U.S. Pat. No. 10,376,360 B2, which is a continuation-in-part of U.S. application Ser. No. 14/846,257, filed Sep. 4, 2015, now U.S. Pat. No. 10,520,216 B2, which is a continuation-in-part of U.S. application Ser. No. 14/487,929, filed Sep. 16, 2014, now U.S. Pat. No. 9,127,856, issued Sep. 8, 2015, which claims priority to U.S. Provisional Patent Application Ser. No. 61/887,533, filed Oct. 7, 2013 and to U.S. Provisional Patent Application Ser. No. 61/907,027, filed Nov. 21, 2013. The present application claims priority to and incorporates by reference in their entirety each of said prior applications.

FIELD OF THE INVENTION

The present invention relates to air filters for ventilation systems and, more particularly, the replacement of such filters.

BACKGROUND OF THE INVENTION

Building air ventilation systems typically include one or more air filters. These filters are generally positioned to filter air which is drawn from the interior of the building through an air handling system (which may heat and/or cool the air) before the air is discharged back into the building.

For example, in the case of a home, a standard air heating and cooling system typically includes one or more air intakes which are located in the interior of the home. An air filter is often located at each intake for filtering the air as it is drawn into the system. These air filters must be regularly changed so that they are effective in removing particulates from the air and so that the filter does not become clogged and impair the air flow through the system.

Unfortunately, the replacement of a used air filter with a new one is often very difficult. For example, home air heating and cooling systems frequently utilize air intakes which are located in the ceiling. The intake includes a housing or plenum which leads to the air handling devices (fans, heating and/or cooling coils, etc.). An air filter is mounted at the entrance to the intake, such as between a flange thereof and a covering grill or grate. The grate is typically pivotally mounted to the intake housing, such as with hinges. The grate can be maintained in its closed position by one or more latches.

Various difficulties arise when replacing the air filter of such a mechanism. First, the user must generally stand on a ladder in order to reach and unlatch the covering grate due to the in-ceiling location of the intake. This requires a user to balance himself on the ladder while attempting to unlatch the latches, which may involve the use of one or more tools.

In addition, once the grate is unlatched, it must swing down from the ceiling to its open position. Because the user must generally position himself under the grate in order to unlatch it, this swinging motion may either result in the grate hitting the user or the user being forced to change positions on the ladder to allow the grate to swing by them. Either of these actions may result in the user falling from the ladder.

Once the grate is open, the filter is unsecured and will then fall from the intake under the force of gravity. This may cause a dirty filter to hit the user, the ladder, the floor or other items, causing the air filter to shed dust and make a significant mess. As a result, the user must generally stay on the ladder and, while avoiding the swinging grate, grasp the used filter.

The user then must climb down the ladder and obtain a new filter. The user then reverses the process, placing the new filter into the intake and attempting to swing the grate back into place and latch it to hold the new filter.

Some attempts have been made to address these issues, but they also suffer from various problems. For example, U.S. Pat. No. 8,075,031 describes a filter changing system where a user attempts to use a pole with filter grabbing teeth in order to remove a used filter. This mechanism, however, does not address the significant problem with the interplay between the grate and the filter. The system of the '031 patent requires that the user turn on their air system while opening the grate or else the used filter will fall. First, a user may not remember to turn on their air system when replacing the system. Second, in some cases this arrangement may not work. For example, some ceiling vents utilize two side-by-side filters. Once a user removes one of these filters there will be insufficient suction to maintain the other filter in place and it will fall on the user. In addition, this system requires that the user attempt to align a large filter element which as close tolerances to the intake housing, remotely via a pole in order to get a new filter placed into the intake housing.

In addition, some commercial ventilation systems have filter housing which are movable. These systems are generally very large and complex and typically utilize motors or other automated controls to move the housings.

SUMMARY OF THE INVENTION

Aspects of the invention comprise, among other things, air intakes with movable filter housings, kits for retrofitting air intakes to include movable filter housings, and methods of removing and replacing air filters. Embodiments of the invention have particular applicability to air intakes which are located in the ceiling of a structure. In such a configuration, a filter housing which is configured to accept one or more air filters is movably mounted relative to the air intake. Preferably, the filter housing is mounted for vertical movement between a raised or closed position in which the one or more filters are located at the air intake to filter air flowing into the air intake, and a lowered position in which the one or more filters are readily accessible for removal and replacement.

One embodiment of the invention comprise a raisable and lowerable filter housing for an air heating/cooling system having an air intake located in a ceiling, the air intake comprising an air return having an air inlet. The filter housing preferably comprises an air intake support, such as a grate having an outer side and an inner side and at least one filter mount for receiving at least one air filter at the inner side of the grate; at least one extendable connector having at least a first portion and a second portion, the first portion connected to the air filter housing; and at least one control tool mount configured to connect a control tool. When the second portion of the at least one extendable connector is connected to the support structure, the air filter housing is movable between a raised position in which the grate is positioned at the air inlet of the air intake return and the at least one air filter associated with the air filter housing is configured to filter air passing through the air intake grate into the air intake return of the air heating/cooling system, and such that when a control tool is connected thereto, a user may lower the air filter housing to a lowered position in which the air filter housing is positioned a distance vertically below the air intake, permitting a user to remove and replace the at least one air filter.

In one embodiment, multiple filter mounts are located at an inner side of the air intake support or grate. The filter mounts may define a plurality of vertically stacked air filter slots, whereby two or more air filters may be arranged in a stacked arrangement at the inner side of the air intake support or grate.

The one or more extendable connectors may comprise cables. The cables may be biased into a retracted position for biasing the filter housing to its retracted position. The biasing mechanisms may be independently adjusted by the user.

In one embodiment, the filter housing further comprises at least one latch for selectively locking or retaining the filter housing in its retracted position.

The control tool may comprise an elongate pole. The control tool mount may comprise a threaded opening accessible at the outer or bottom side of the grate, such as for accepting a threaded end of the pole. The pole or other control tool may be weighted, such as by attachment to a dolly, so that the control tool maintains the filter housing in its extended position against an upward biasing force applied by the one or more connectors. In another embodiment, one or more brakes may be used to selectively maintain the position of the air filter housing, such as to maintain the air filter housing in its lowered position. The one or more brakes may, for example, engage biased pulleys which reel the extendable connectors. The one or more brakes are preferably user controllable, such as via the pole or other control tool.

One embodiment of the invention is an air filter condition indicator. The air filter condition indicator may be associated with the air filter housing of the invention to provide an indication of the air filters associated therewith. The air filter indicator may comprise one or more an air flow passages in communication with an exterior side of the air filter housing and an interior side thereof, at least one air sensor associated with the at least one passage, and at least one condition indicator. The air sensor(s) may sensor or measure the air pressure or speed through or in the one or more passages. A condition of the indicator may be based upon the output of the at least one air sensor. The indicator may comprise one or more visual or audible indicators, such as one or more lights. In one embodiment, the indicator may comprise a green light when the one or more air sensors sense a low pressure in the passage and a red light when a high pressure is detected.

Further objects, features, and advantages of the present invention over the prior art will become apparent from the detailed description of the drawings which follows, when considered with the attached figures.

DESCRIPTION OF THE DRAWINGS

FIG. 3 illustrates a filter housing of the present invention with an air filter removed there from;

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise air intakes with movable filter housings, kits for retrofitting air intakes to include movable filter housings, and methods of removing and replacing air filters. Embodiments of the invention have particular applicability to air intakes which are located in the ceiling of a structure. In such a configuration, a filter housing which is configured to accept one or more air filters is movably mounted relative to the air intake. Preferably, the filter housing is mounted for vertical movement between a raised or closed position in which the one or more filters are located at the air intake to filter air flowing into the air intake, and a lowered position in which the one or more filters are readily accessible for removal and replacement.

Figure 1:
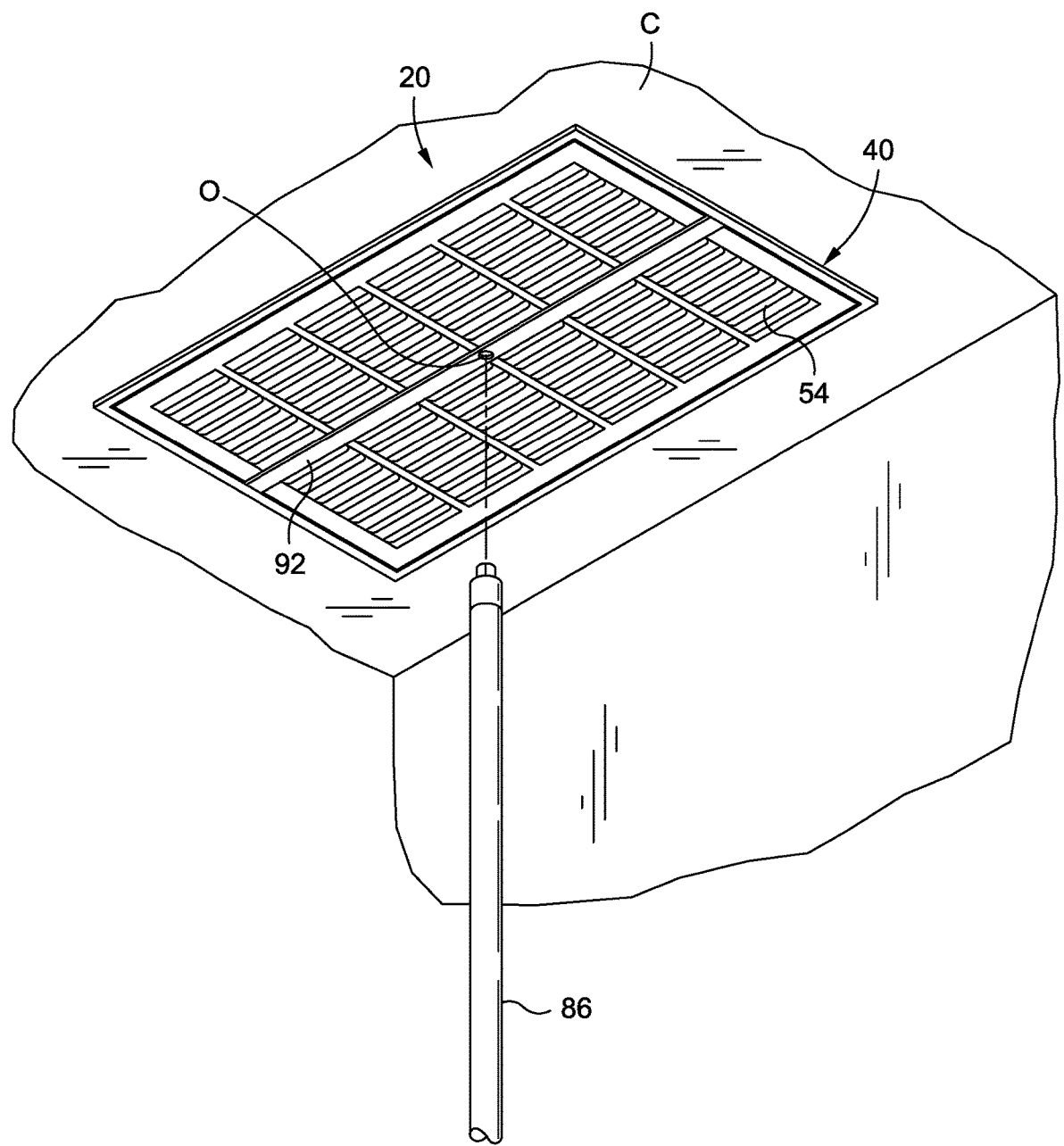
FIG. 1 illustrates an air intake of the present invention as located in a ceiling of a structure, the air intake comprising a filter housing.

FIG. 1 illustrates an air intake 20 for an air system, such as an air heating and/or cooling system (often referred to as an HVAC system). The air intake 20 is located at a ceiling C of a structure such as a house.

Figure 2:
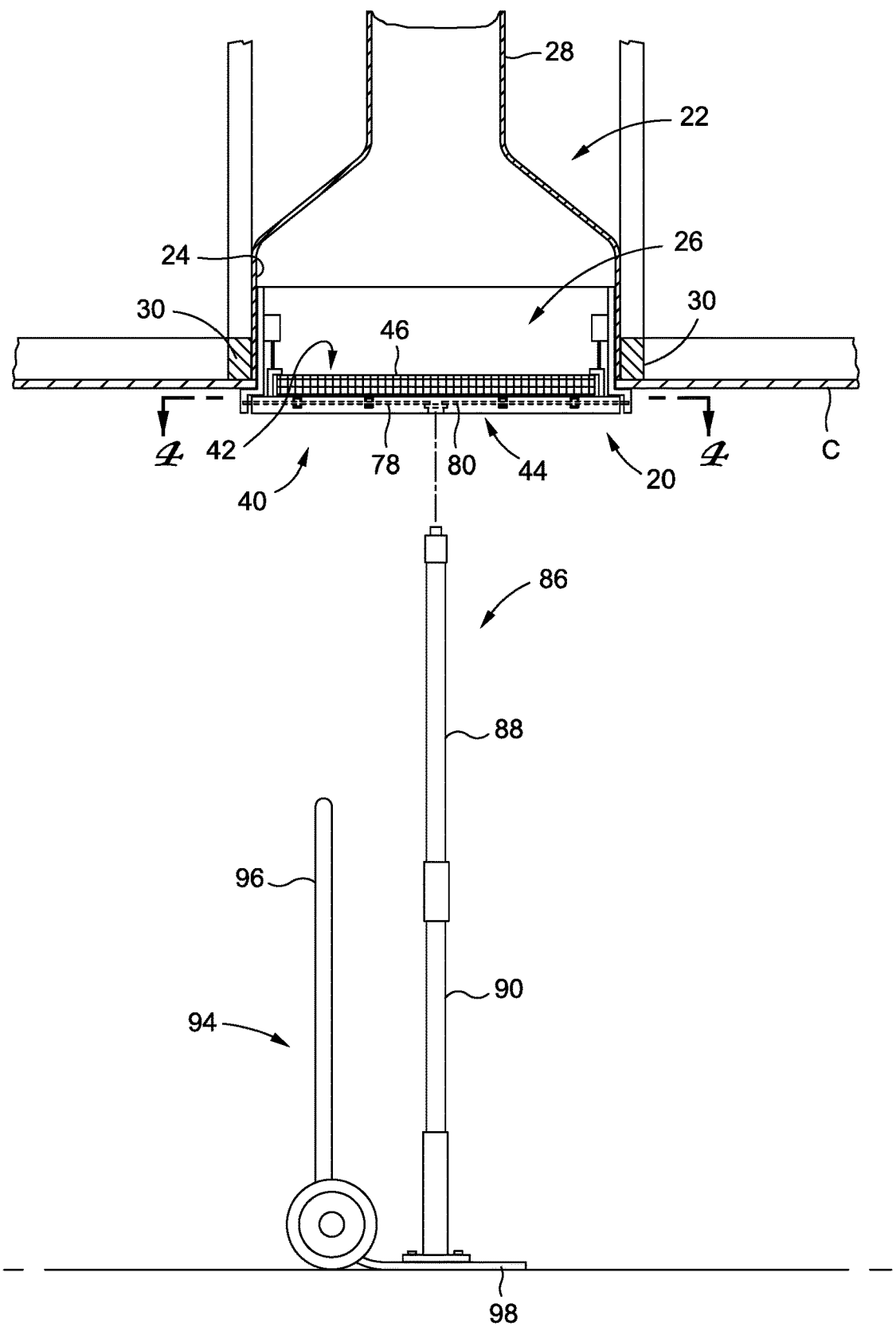
FIG. 2 is a cross-sectional view of the air intake which is illustrated in FIG. 1, along with an access tool of the invention.

As illustrated in FIG. 2, the air intake 20 comprises an air intake return 22. The air return 22 may have various configurations, depending upon the particular installation. FIG. 2 illustrates one configuration where the air return 22 generally comprises a box-shaped structure 24. One end of the air return 22 defines an air inlet 26 and the other preferably defines an exit path or opening, such as defined by a duct 28, through which air flows to an air handling device such as a fan. The air return 22 is preferably supported in the ceiling C, such as by one or more supports 30, such as 2 inch by 4 inch wooden or metal studs. The air inlet 26 is aligned with an opening which is defined in the ceiling C, whereby air may flow from an interior space of the structure through the opening in the ceiling C and into the air return 22 to the air handling system (such as for heating or cooling the air and then returning the air back into the structure at one or more vents, as is well known).

The shape of the air inlet 26 may vary and may be square, rectangular or other shapes. The dimensions of the air inlet 26 may also vary, but are commonly set sizes, such as 20 inches by 20 inches, 20 inches by 30 inches or the like.

Figure 3:
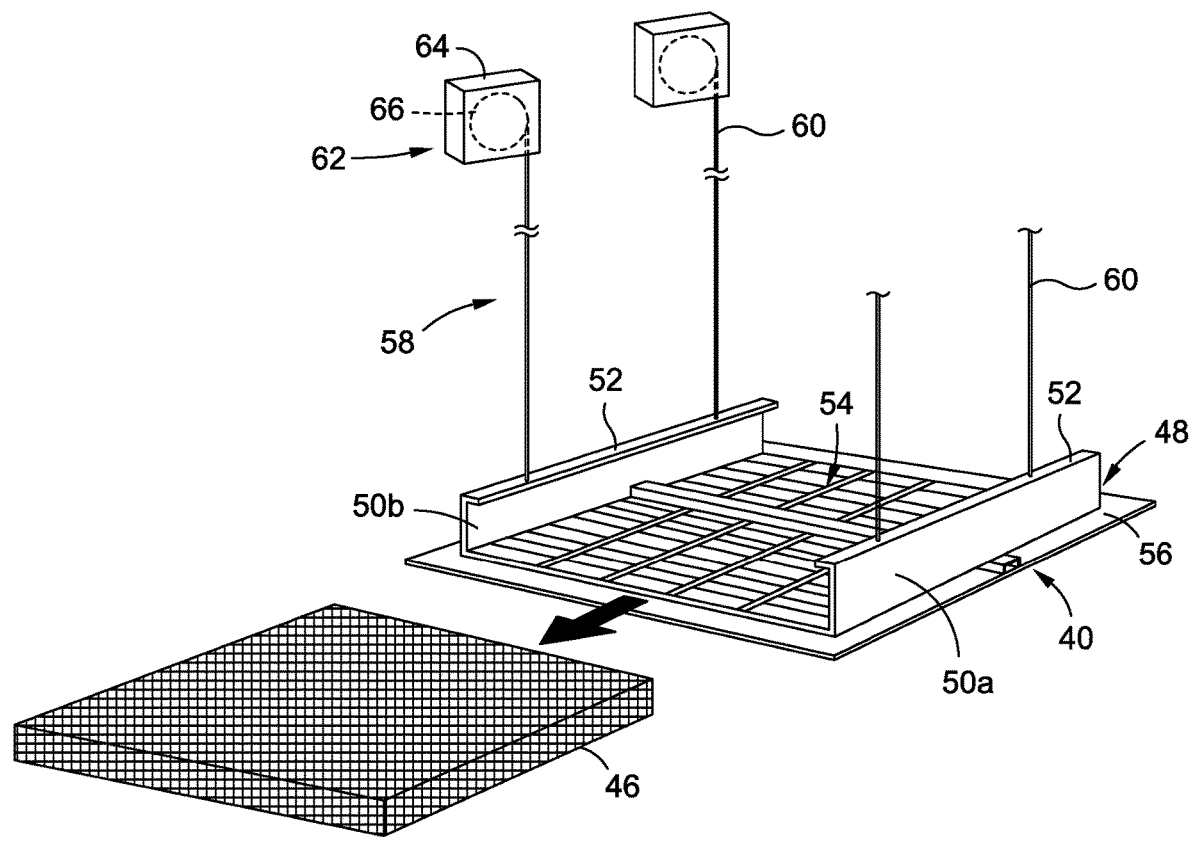

Referring FIGS. 1-3, in accordance with the invention, a filter housing 40 is selectively locatable at the air inlet 26 of the air return 22. The filter housing 40 preferably comprises a grill or grate, or other support. The grate may be constructed from metal, or to reduce weight, be constructed from plastic or other materials. The filter housing 40 has a top or inside 42 and bottom or outside 44. One or more openings 54 are defined through the filter housing 40 from the bottom 44 to the top 42, thus permitting air to flow through the filter housing 40. In one embodiment, the openings 54 are located in a central portion of the filter housing 40 and a generally closed flange extends 56 around the periphery.

Figure 12:
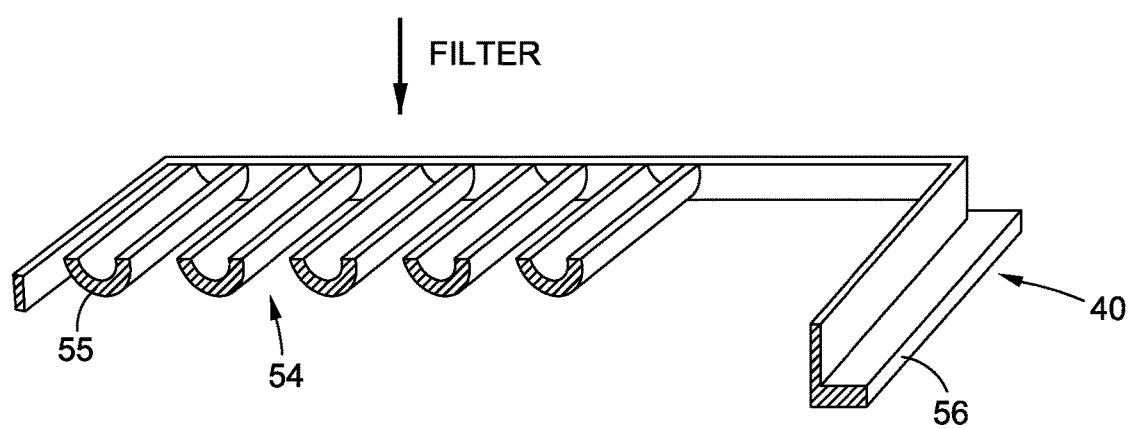
FIG. 12 illustrates, in partial cross-section, an embodiment of a grate or grill of a filter housing in accordance with the present invention.

Referring to FIG. 12, in one embodiment, the grill or grate portion of the filter housing 40 comprises a plurality of spaced supports 55. The air flow openings 54 are defined between the supports 55 (and/or between the supports 55 and the frame of the grill or grate). In one embodiment of the invention, the supports 55 have a "U" shaped, circular or other arcuate cross-section facing at least the bottom 44. In this manner, the air flow around the supports 55 and through the openings 54 is much less turbulent. This makes reduces the noise associated with the air being drawn through the filter housing 40, whereby the filter housing 40 operates more quietly than conventional air filter grates which use generally flat metal slats.

The filter housing 40 may have various shapes, but preferably has a peripheral shape which matches the shape of the air inlet 26 and is preferably closely sized to the air inlet 26 so that the majority of air which is drawn into the air inlet 26 must pass through the filter housing 40.

In a preferred embodiment of the invention, the filter housing 40 is configured to support at least one air filter 46. In a preferred embodiment, as illustrated in FIG. 3, the air filter 46 is configured to be removably supported at the top 42 of the filter housing 40. In one embodiment, a filter mount 48 is defined by or attached to the filter housing 40 and is located at the top 42 of the filter housing 40. As illustrated, the filter mount 48 may comprise at least a first support 50a and an opposing second support 50b. The supports 50a,b are spaced from one another, with each support 50a,b preferably mounted to the flange 56 of the filter housing 40 (outside of the openings 54), and extend upwardly from the filter housing 40. In one embodiment, each support 50a,b has an inwardly extending flange 52. The inwardly extending flanges 52 are spaced from the filter housing 40, preferably by a distance which is slightly greater than the thickness of an air filter 46. As described in more detail below, in such a configuration, an air filter 46 can be removably inserted into the filter mount 48 in a horizontal direction, as illustrated in FIG. 3. In a preferred embodiment, the at least one air filter is supported above the grate or grill (e.g. the bottom of the filter does not sit or rest upon the tops of the supports of the grate or grill, but is spaced or set upwardly therefrom).

The filter housing 40 may have other configurations. For example, instead of defining or including a grate, the filter housing 40 might merely comprise a peripheral frame around one or more large openings. The one or more air filters 46 may then be supported so that they extend over the one or more openings (instead of being positioned behind/ above a grate, the one or more filters might span or extend over one or more larger openings, whereby the weight of the filter housing 40 may be reduced by eliminating much of the central grate).

Figure 6:
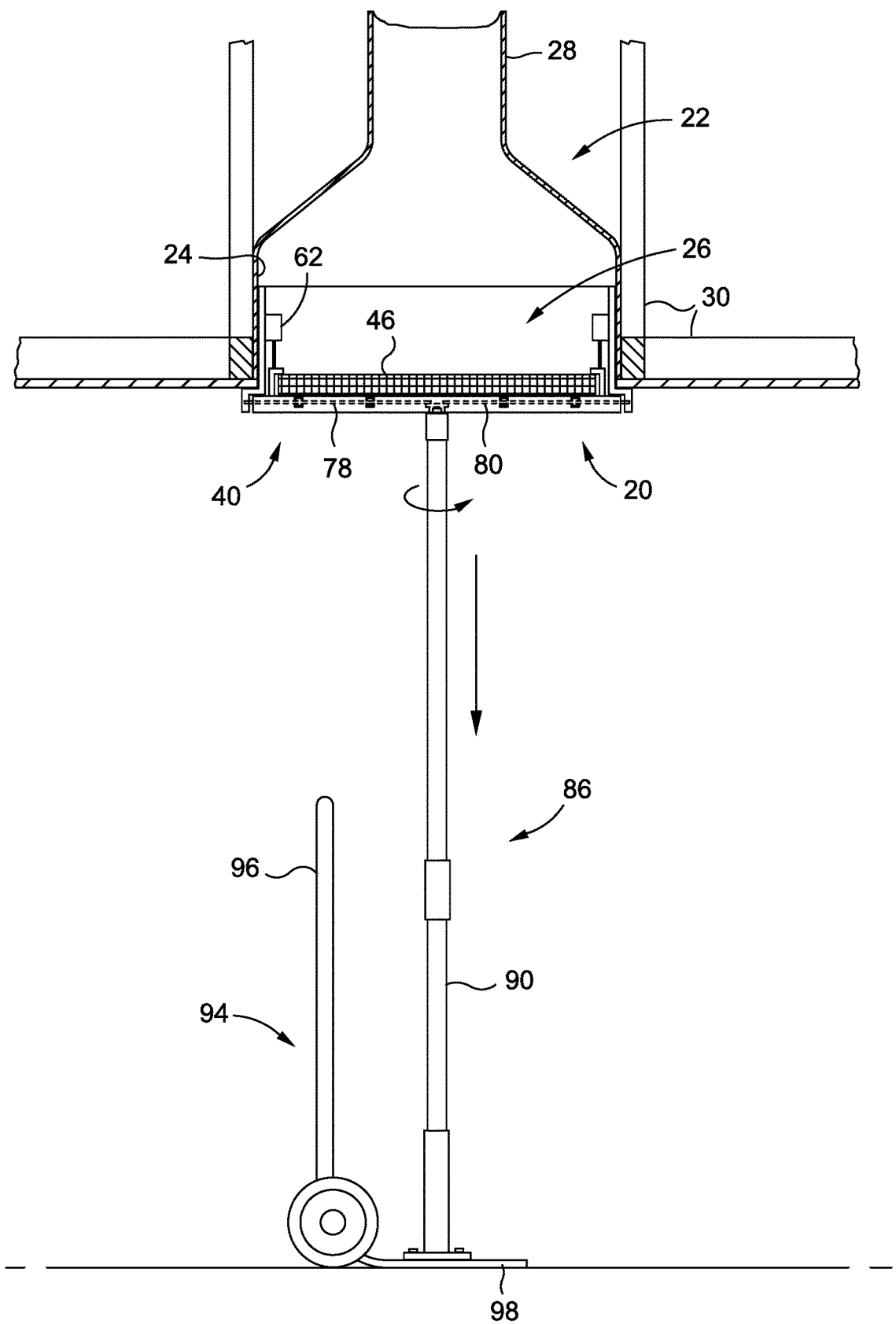
FIG. 6 is a cross-sectional view of an air intake of the present invention with an access tool connected to a filter housing thereof while the filter housing is in a retracted position.
Figure 7:
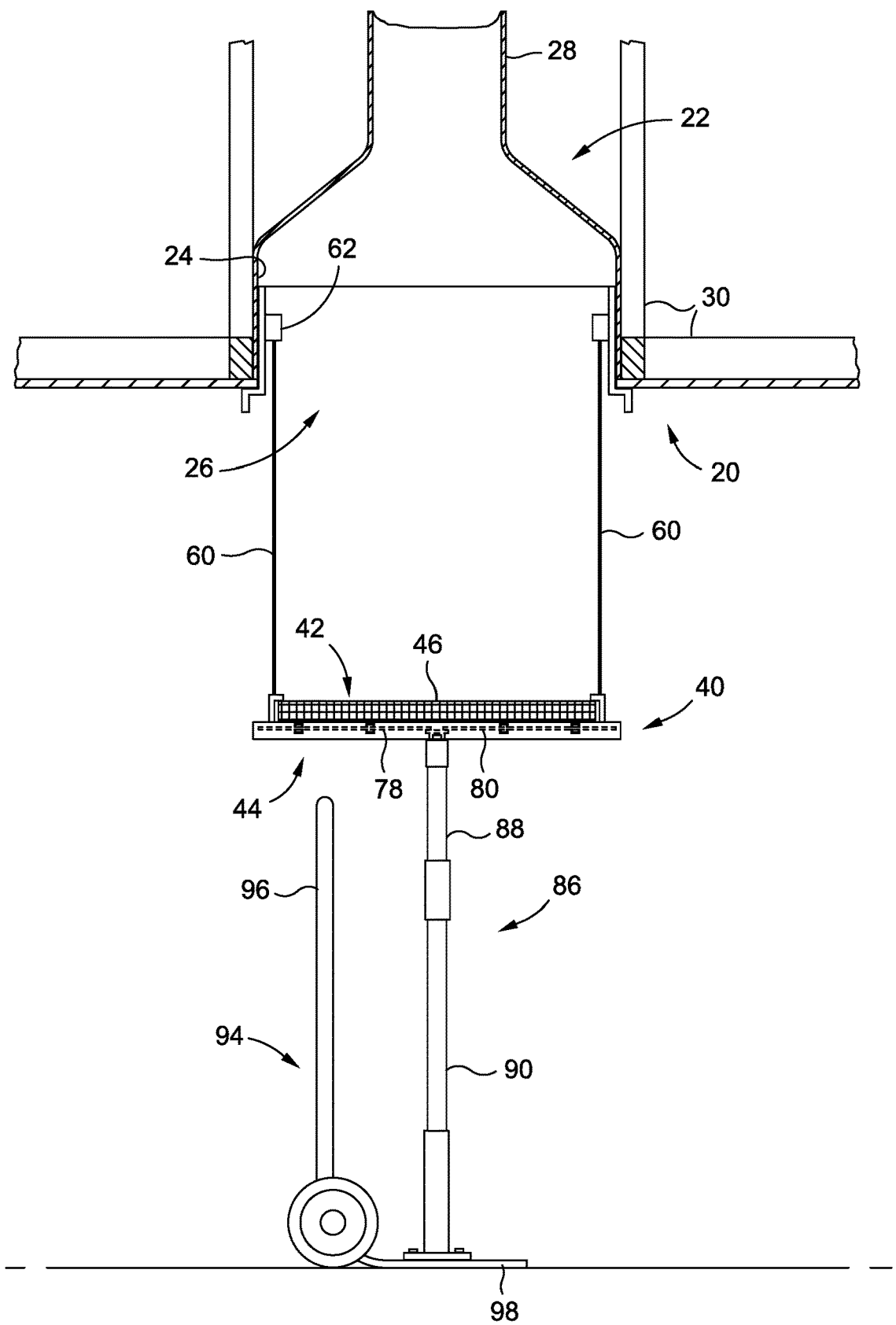
FIG. 7 is cross-sectional view of the air intake of FIG. 6 with the filter housing moved to a lowered, air filter access position.

Preferably, the filter housing 40 is movable relative to the air return 22. Most preferably, the filter housing 40 can be moved from a first, raised position in which it is located at the air inlet 26 (as illustrated in FIGS. 2 and 6), to a second, lowered position in which it is positioned below the air inlet 26 (as illustrated in FIG. 7). Preferably, means are provided for movably supporting the filter housing 40. Most preferably, this means for movably supporting comprises one or more mechanical supports.

In one embodiment, the means for movably supporting comprise at least one, preferably two or more, and most preferably four, extendable connectors 58. In one embodiment, the connectors 58 comprise cables 60 or other flexible members (such as wires, straps or the like). The cables 60 may comprise solid or braided wire or other durable material. In one embodiment, each cable 60 has a first end which is connected to the filter housing 40 and a second end which is connected to a mount 62. Each mount 62 may comprise a housing 64, at least one pulley 66 (to which the second end of the cable is connected), and at least one biasing element or mechanism (not shown) such as a spring or the like which is configured to bias the pulley 66, preferably in a winding direction as described below. Each mount 62 is preferably connected to the air return 24.

In a preferred embodiment, there are four cables 60. The first ends of the cables 60 are mounted directly or indirectly to the flange 56 of the filter housing 40 or the supports 50a,b, so that they are spaced apart from one another, contributing to the stability of the unit when it is raised and lowered, and so that they are not in the air flow path through the filter housing 40 and air intake 26, as described below.

The second end of each cable 60 is configured to be biased by its respective pulley 66 or other movable mount. In one embodiment, each cable 60 winds on or unwinds from its associated pulley 66. In a preferred embodiment, the means for biasing, such the spring, biases its associated cable 60 into a wound or retracted position, as described in more detail below. In one embodiment, a spring tension adjustment or adjuster may be provided. The spring tension adjuster may allow the user to selective adjust the spring tension, thus adjusting the biasing force which is generated by the spring (and thus the upward force on the cable 60). For example, relative to a coil spring such as detailed herein, the coil spring might be mounted on a pin or axle. A user may engage a head of the pin and rotate it (such as with a tool—e.g. a socket wrench, etc.), thus either causing the coil spring to coil more tightly or to loosen it. In one embodiment, a user may adjust the spring tension of each spring, and thus control the biasing force applied to each cable 60, separately. This allows, for example, a user to customize the biasing force based upon the particular application of the filter housing 40. For example, if the filter housing 40 is installed in a ceiling which is 20 feet high, a higher spring tension may be needed to raise the filter housing 40 (and the associated cabling) than if the filter housing is installed in a ceiling which is only 8 feet high. Also, one user might associate 3 or 4 stacked filters with their filter housing 40 while another use might only use one filter. The first user might thus need to increase the biasing force to compensate for the extra filter weight. Also, the ability for the user to separately control or adjust the biasing force allows the user to ensure that the filter housing 40 is raised upwardly in a level position and not askew (for example, if each cable has 20 ft-lbs of upward bias force but one corner of the filter housing 40 weighs slightly more than the other corners/areas, then the filter housing 40 will tilt when it is raised upwardly; by adjusting the bias applied to the heavier corner, the user can ensure that the filter housing stays level as it is raised).

Figure 4:
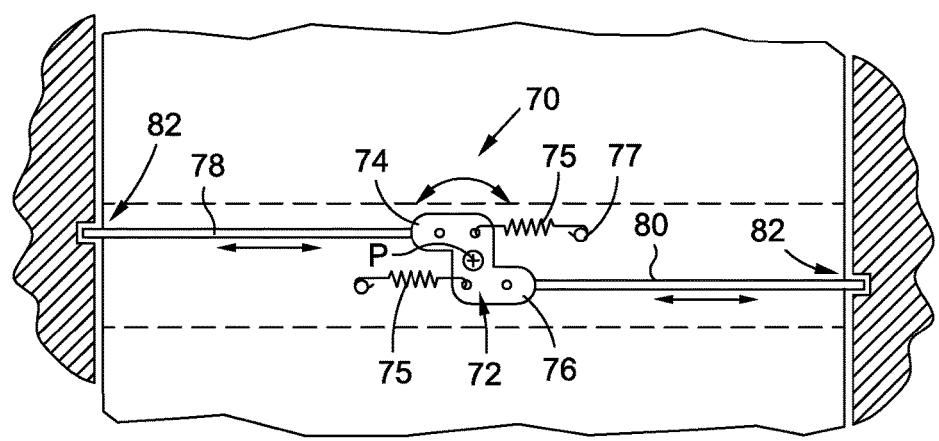
FIG. 4 illustrates a filter housing latching system of the present invention.

In a preferred embodiment, the filter housing 40 further comprises a means for selectively locking the filter housing 40 to the air return 22 or the associated support structure. Referring to FIG. 4, the means for selectively locking may comprise a latch 70. In one embodiment, the latch 70 comprises a pivot 72 which is rotatably mounted to the filter housing 40, and one or more arms which are mounted to the pivot 72 and which move with the pivot. In one embodiment, the pivot 72 has a first leg 74 and a second leg 76 which are offset from one another on either side of a pivot point P, and which extend in opposing directions from one another. A first arm 78 extends from the first leg 74 and a second arm 80 extends from the second leg 82. Each arm 78,80 have a free end which is configured to selectively engage an aperture 82 or other mating structure.

In one embodiment, the apertures 82 are defined in or by the intake return 24 or the associated mounting structure there for. When the two arms 78,80 have the configuration illustrated in FIG. 4, two apertures 82 are located in generally opposing positions across from one another.

In one embodiment, the latch 70 is biased to a locked position. As illustrated in FIG. 4, one or more springs 75 may be utilized for this purpose. For example, springs 75 may extend between the first leg 74 and the second leg 76 of the pivot 72 and the filter housing 40 (or, as illustrated, one or more mounts 77 associated with the filter housing 40) in a direction which biases the pivot 72 to its latched position. Of course, other mechanisms might be utilized, such as a single spring or more than two springs, one or more springs (such as coil springs) mounted around and configured to bias a mounting shaft of the pivot 72, etc.

Figure 5:
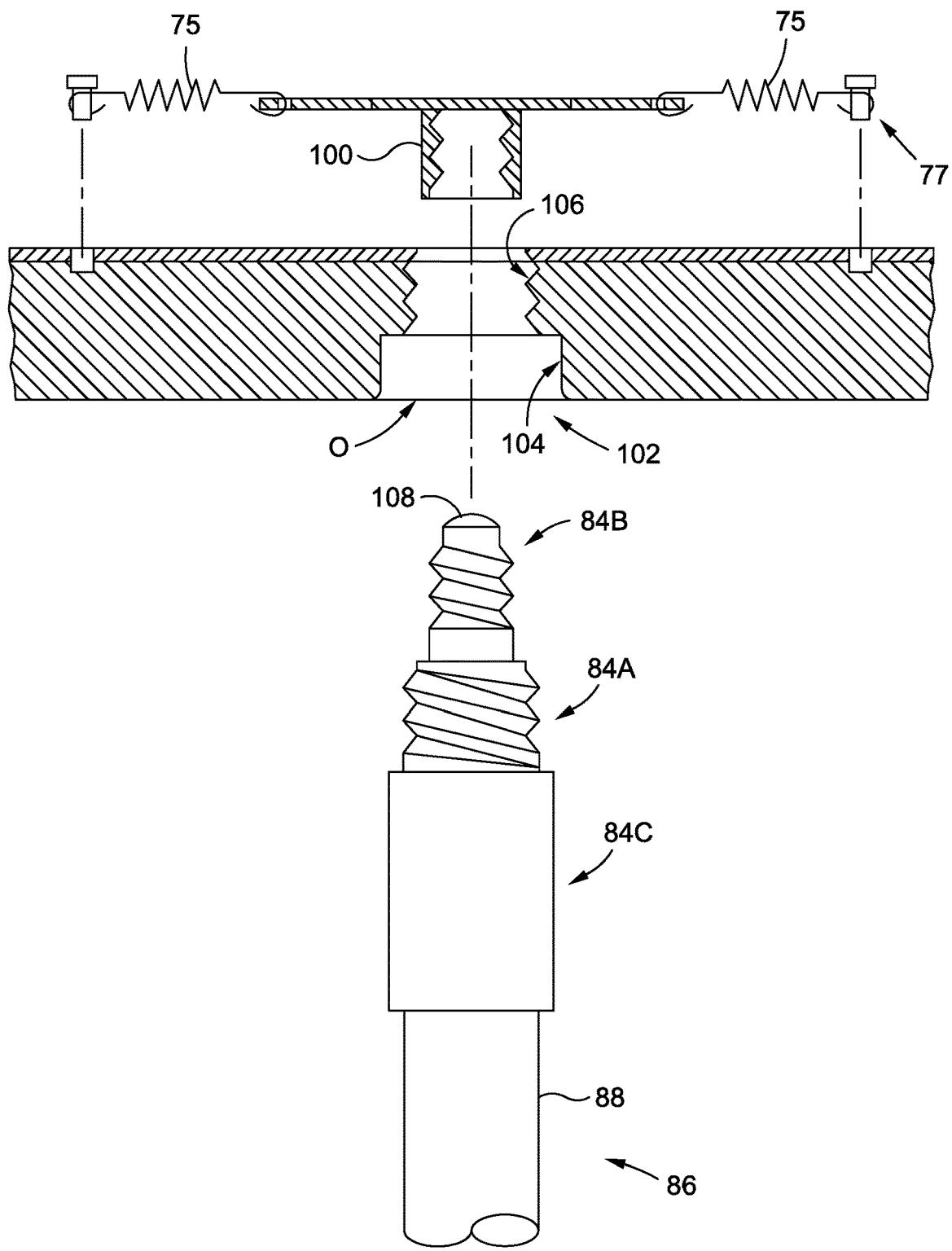
FIG. 5 illustrates a filter housing and associated control tool of the invention.

In a preferred embodiment, the latch 70 is configured to be remotely actuated by a user using a tool. Referring to FIG. 5, in one embodiment, the pivot 72 has a tool connector 100. In one embodiment, the tool connector 100 comprises a threaded opening or socket which is associated with the pivot 72. The connector 100 is configured to accept a first threaded portion 84B of an actuating tool.

Preferably, the latch 70 is configured so that when the user turns or threads the first threaded portion 84B of the tool into engagement with the mount 100, it causes the pivot 72 to rotate to its unlatched position. When the user removes the tool, the latch 70 is biased back to its closed or locked position. As described below, in a preferred embodiment, the tool for unlocking the latch 70 is a pole 86 which is also used to control the filter housing 40.

In a preferred embodiment, a tool opening O is located centrally to the filter housing 40, as illustrated in FIGS. 1 and 5. In order to keep the latch 70 out of the air flow path through the filter housing 40, the pivot 72 and the arms 78,80 may be located behind a structural support, such as a bar 92, of the grate portion of the filter housing 40 (i.e. the arms 78,80 extend in either direction from the pivot 72, parallel to the bar 92).

In one embodiment, the filter housing 40 includes at least one tool accepting mount 102. The at least one tool accepting mount 102 is configured to accept or connect a control tool for use by a user in moving the filter housing 40 from its first or retracted position to its second or lowered position. In one embodiment, the control tool comprises an elongate pole 86.

In one embodiment, the pole 86 has at least two portions (though it may have more than two portions), such as a bottom portion 90 and a top portion 88. The top portion 88 may be movable relative to the bottom portion 90, such as in a telescopic arrangement which permits the top portion 88 to be extended or retracted relative to the bottom portion 90. In one embodiment, means may be provided for selectively locking the top portion 88 to the bottom portion 90, such as to fix the top portion 88 in a particular position.

In one embodiment, the tool accepting connector or mount 102 comprises the opening O. This opening O or mount 102 preferably has a first shoulder portion 104 for accepting a body 84C of the pole 86, and a second threaded portion 106 for accepting a second threaded portion 84A of the pole 86. The shoulder portion 104 preferably has a size which permits the first and second threaded portions 84A,B of the pole 86 to pass therethrough, but which is designed to engage the body 84C of the pole 86. In this manner, the shoulder portion 104 and abutting body 84C of the pole 86 aid a user in aligning or positioning the pole relative to the opening O.

The second threaded portion 84A of the pole 86 is configured to engage the threaded portion 106 of the mount 102. The second threaded portion 84A of the pole 86 is positioned between the first threaded portion 84A and the body 84C. The threaded portion of the mount 102 is sufficiently large to permit the first threaded portion 84A of the pole 86 to pass there through, into engagement with the connector 100 of the latch 70.

As described in more detail below, in this arrangement the pole 86 acts as a tool for controlling the latch 70 and also for controlling the filter housing 40, via a single connection. In particular, when the user extends the pole 86 into the opening O, the first threaded portion 84B extends into the connector 100 of the latch 70 while at the same time the second threaded portion 84A engages the filter housing mount 102. When the user turns or twists the pole 86, the pole is threaded into engagement with the connector 100 and the mount 102. Preferably, the first threaded portion 84A is longer than the first threaded portion 84B so that eventually the pole 86 bottoms out or fully engages the connector 100 of the latch 70, thus causing the latch to turn to its unlatched position (a tip 108 of the pole 86 may be rounded and may be constructed of plastic or a similar durable, but relatively low hardness material so that when the end of the pole 86 hits the bottom of the connector 100 (which may be constructed from metal), it does not damage it).

In one embodiment, the pole 86 may be weighted, such as by being attached to a base. In this manner, when the filter housing 40 is moved to its lowered position, the weight of the pole 86 and/or base, serve to maintain the filter housing 40 in its lowered position against the biasing force which is applied by the extended cables 60. As one example, the pole 86 might comprise a solid body or the like with sufficient mass for this function. In another example, the pole 86 might include a foot plate which has sufficient mass for this function or which a user can step on to hold it in place.

In a preferred embodiment, the pole 86 may be connected to a cart or dolly 94 for movement with the dolly 94. As illustrated in FIG. 2, the dolly 94 may have an upwardly extending handle portion 96 for gripping by a user and a base portion 98 for supporting the pole 86. The dolly 94 may be wheeled for easy movement/positioning, such as by including two or more (such as four) wheels. One or more brakes may be provided for selectively maintaining the dolly 94 in a fixed position (such as by locking the position of one or more of the wheels). The pole 86 or other tool might be disconnectable from the dolly 94 and/or pivotally mounted to the dolly 94, such as to permit the position of the pole 86 to be adjusted relative to the dolly 94.

The air intake 20, including the filter housing 40, may be installed as an assembly, such as during the construction of a dwelling or other structure. An opening may be formed in a ceiling C and the air return 22 and an associated filter housing 40 may be located at that opening. However, an existing air intake which utilizes a swinging grate or other configuration of the prior art may also be modified to incorporate the filter housing 40 of the present invention.

Figure 8A:
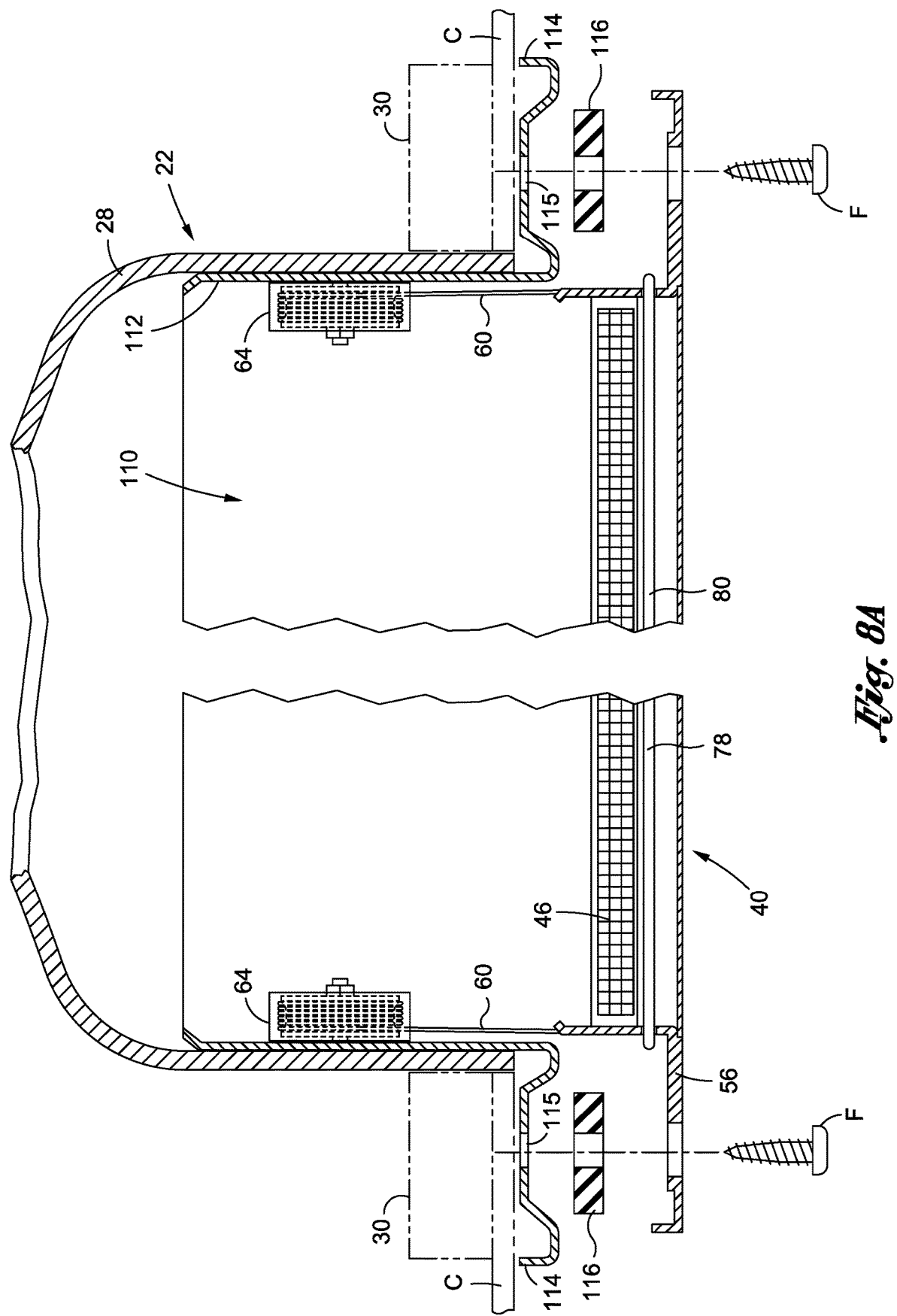
FIG. 8A is a cross-sectional view of a filter housing kit for installation relative to an air intake.

In this regard, one aspect of the invention is an air intake 20 retrofit kit. FIG. 8A illustrates one embodiment of such a kit. The kit may comprise, for example, an assembly which comprises a mounting bracket or body 110 to which is attached the movable supports and the filter housing 40. The kit may also include a control tool (such as the pole 86 or the combined pole 86 and dolly 94).

A user may remove the existing filter grate, such as including the associated hinges, thus leaving the air inlet 26 of the existing air return 22 open. The user may then connect the filter housing 40 of the present invention to the existing air return 22. As illustrated in FIG. 8A, the user may press the kit upwardly into the air return 22 so that a sleeve portion 112 of the bracket 110 is located in the air return 22 and so that one or more flange portions 114 of the bracket 110 are located against the ceiling C. In a preferred embodiment, the apertures for the latch arms 78,80 are defined by the bracket 110, so that the user can maintain secure the filter housing 40 to the bracket 110 in its closed/retraced position during the mounting process (and so that the user does not need to form apertures in the existing air return 22 or associated support structure).

The user may then attach the bracket 110 to the structure/ceiling C with one or more fasteners F. In one embodiment, one or more openings or apertures 115 are defined through the filter housing 40 (such as the flange portion 56 thereof) through which a user may pass the fasteners F into engagement with the one or more flange portions 114. The fasteners F are preferably used to engage or connect the flange portions 114 with the structure, such as by connection to studs or other supports 30 located in the ceiling C. For example, the fasteners F may comprise threaded fasteners such as lag bolts or screws which may be tightened into studs or other supports in the ceiling C.

Figure 8B:
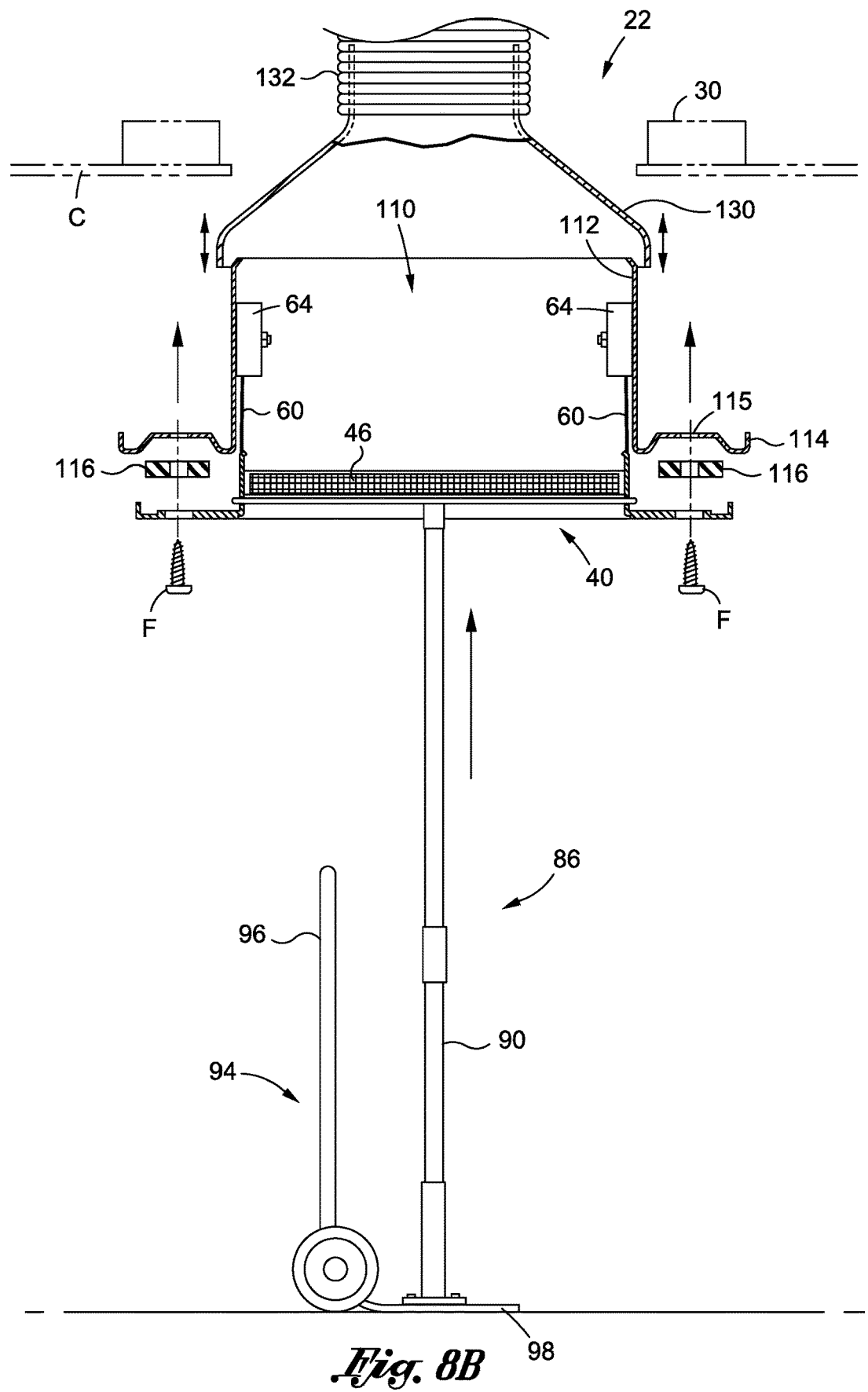
FIG. 8B is a cross-sectional view of a filter housing installation configuration according to an embodiment of the invention.

As illustrated in FIG. 8A, one or more gaskets or seals 116 may be located between the filter housing 40 and the flange portions 114. The gaskets or seals 116 might be connected to either or both of these members and preferably serve to seal the space between the filter housing 40 and the flange portion(s) 114 when the filter housing 40 is in its retracted or raised position.

Where the kit includes a dolly 94 and associated pole 86, the dolly and pole may be used by the user to stabilize and/or support the kit during the installation process, similar to that described below relative to the installation shown in FIG. 8B.

Of course, in other embodiments, an air intake 20 might be modified or retrofit in other manners. For example, instead of providing a unified kit, a user might form apertures 86 in the sides of the air return 22 (for the latch arms 78,80) and connect the mounts 62 to the air return 22, such as with screws or other fasteners, whereby the filter housing 40 is mounted to the air return 22 or associated support structure, rather than to a bracket or mount which is in turn mounted to the air return 22 or associated support structure.

A kit might also be used in a new installation, e.g. one where there is not an existing air intake return. Such a situation might occur, for example, during the construction of a new home wherein a ceiling C has one or more openings therein at which an air intake is to be located.

Once again, a kit may be provide which, in one embodiment, may comprise an assembly of the mounting bracket or body 110 to which is attached the movable filter housing 40. In this configuration, the body 110 comprises a supporting element or structure for other components of the assembly, such as the movable filter housing 40. Further, the body 110 may act as an air intake, such as by defining an air inlet and air outlet. The filter housing 40 is preferably movably mounted to the body 110, such as in the manner described above.

Once again, the user may raise the assembly upwardly into the ceiling C and then mount the assembly to the ceiling, such as by using fasteners F in the manner described above. As illustrated in FIG. 8B, and advantage of the invention is that an installer may mount or connect a control tool (such as the pole 86 which is described above) to the assembly, such as by connecting the control tool to the control tool mount which is configured to facilitate unlatching and/or raising and lowering of the air filter housing. The user may use the control tool to raise the assembly upwardly, such as by extending an extendable portion thereof. The control tool or other device may thus be used to support and stabilize the assembly during the raising and mounting process. Further, in a preferred embodiment, the tool which is used to raise and support the assembly for mounting may be the same one which is used to unlatch and/or raise and lower the air filter housing (although the tools could be different).

As indicated, the body 110 preferably defines an air outlet. That outlet may be connected to an air duct or other air transporting or handling elements. For example, as illustrated in FIG. 8B, an air duct 22 is preferably connected to the assembly, such as the sleeve portion 112 of the body 110. The air duct 22 might comprise, for example, an adapter 130 and a flexible hose 132. The adapter 130 might be configured to mount to the body 110 and transition the size of the opening in the body 110 to the flexible hose 132. Of course, other types of ductwork or elements might be mounted or connected to the assembly and their means of connection might vary (fasteners, threading, tightenable bands, slip fit, etc.).

Once the assembly is mounted, the user may raise and lower the filter housing 40 and associated filter 46 relative to the body 110 and the ceiling C, in the manner described above. When the tool which is used to mount the assembly is the same as the control tool which is designed to unlatch and raise/lower the filter housing, the user may use that tool after installation in order to move the filter housing to change the filter, etc.

In accordance with this aspect of the invention, an air intake may be configured using an assembly of the invention by simply mounting an entire assembly having a movable filter housing 40 (rather than via retrofitting an existing air duct). The assembly is easy to install using the control tool and, when complete, includes the filter raising and lowering feature of the present invention.

Additional details of the invention will be appreciated from a description of a method of replacing a filter in accordance with the invention.

As illustrated in FIG. 6, a user of an HVAC system may wish to check or replace an air filter 46 which is associated with an air intake 20 having the filter housing 40 of the present invention. In its use position, the filter housing 40 of the invention is located in the air inlet 26 of the air return 22, and is thus in a first or raised position at the ceiling.

The user must thus first lower the filter housing 40. In one embodiment, this requires that the user first unlatch or unlock the filter housing 40 so that it can be moved. As indicated above, this may require the user to unlock a latch 70. Once unlocked, the user must pull the filter housing 40 downward.

In a preferred embodiment, this is accomplished by use of the control tool. As described above, this may comprise a pole 86. The user may attach the pole 86 to the filter housing 40 and latch 70. As illustrated in FIG. 6, a user may move the pole 86 into position, such as by moving the dolly 94 under the filter housing.

The user may then extend the pole 86 upwardly until it engages the filter housing 40 and latch 70 (where the pole 86 is mounted to the dolly 94 and has a bottom section 90 and a top section 88, the user may extend the top section 88 towards the filter housing 40). In one embodiment, the user rotates the pole 86 (or at least the top section 88) so that the first threaded portion 84B engages the latch connector 100 and the second threaded portion 84A engages the mount 102. Continued turning of the pole 86 eventually causes the first threaded portion 84B to so engage the connector 100 that the pivot 72 is rotated, thus unlatching the arms 78,80.

Once unlocked or unlatched, the user may pull downwardly on the filter housing 40 via engagement of the pole 86 with the filter housing 40. As the user pulls downwardly, the cables 60 unwind or are otherwise extended, as illustrated in FIG. 7. Once the filter housing 40 has a reached a position where the user can reach the filter 46, the user may lock or maintain the position of the filter housing 40. In one embodiment, where the pole 86 has a top section 88 which can be moved relative to a bottom section 90, the user may lock the position of the upper section. At that point, the weight of the pole 86 and/or dolly 94 preferably maintains the filter housing 40 in the desired position. In one embodiment, the filter housing 40 may be lowered between 3 and 8 feet, though the distance or range of distances may vary depending upon the installation (including floor to ceiling height of the structure). In one embodiment, the filter housing 40 can be lowered to around 3 to 6 feet above a floor or other support surface which is located below the air intake 20.

The user may then slide the existing air filter 46 out of its filter mount 48 at the top of the filter housing 40. The user may then either clean that filter and re-insert it, or insert a replacement air filter 46 into the mount 48. Most importantly, during this process the filter housing 40 is maintained in a lowered, stable position (the filter housing 40 will not swing around and potentially hit the user, a wall or the like, because it is secured by the control tool (such as the pole 86 and/or dolly 94).

The user may then raise the filter housing 40 back to its first, retracted position. In a preferred embodiment, the user preferably allows the upper section of the pole 86 to move relative to the bottom section 90. The filter housing 40 preferably moves upwardly as a result of the biasing of the cables 60.

In a preferred embodiment, use of four cables 60 balances the filter housing 40 so that it moves smoothly upwardly into the air inlet 26 (and does not tilt or become offset and thus not seat within the air inlet 26). Once the filter housing 40 is raised, the user preferably again locks or latches it, such as by rotating the pole 86. As indicated above, in one embodiment, when the user twists the pole to release it from the pivot 72, it automatically turns the pivot 72 to latch the latch 70 (by causing the free ends of the arms 78,80 to enter their mating apertures 86). With the filter housing 40 latched into its raised position, the user may move the pole 86 and dolly 94 away.

Once the filter housing 40 is raised, it is positioned at the air inlet 26. Air which is drawn by the air handling system thus flows from the area at the exterior or bottom 44 of the filter housing 40 through the openings 54, through the one or more air filters 46, into the air return 22. The one or more air filters 46 are maintained in position (and are not drawn upwardly into the air return 22) because they are secured by the filter mount 48.

Figure 11:
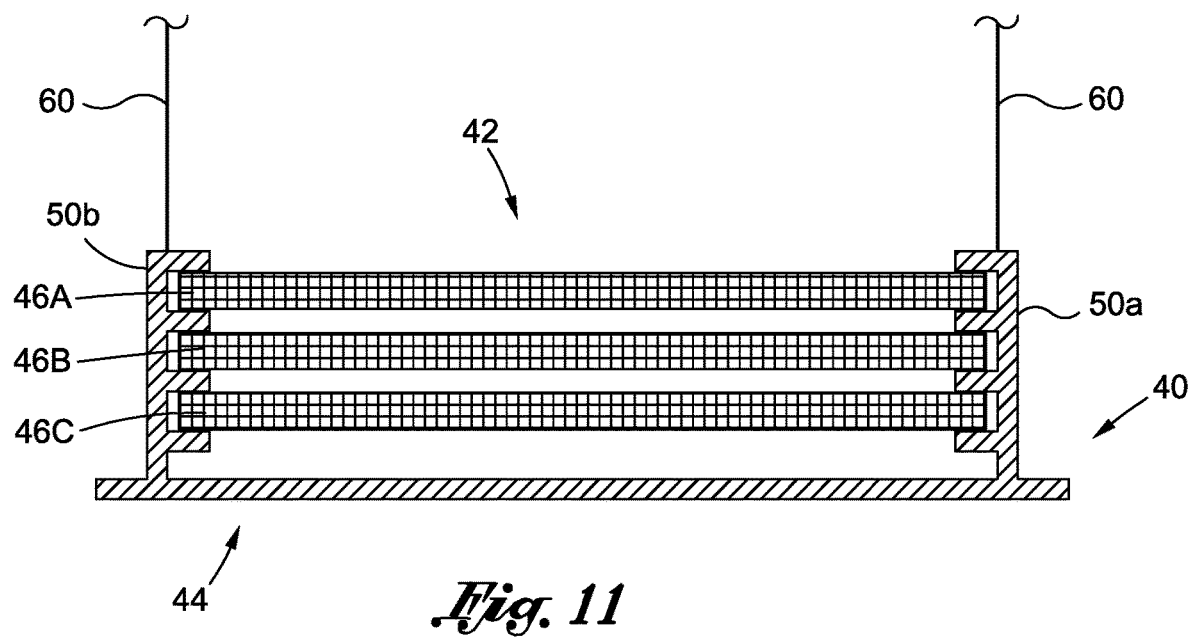
FIG. 11 illustrates a filter housing having a stacked filter configuration in accordance with the present invention.

It will be appreciated that the invention may have a variety of other configurations than exactly as described above. First, the filter housing 40 may be configured to support more than one air filter. For example, if the air inlet 26 is approximately 40 inches by 40 inches, the filter housing 40 may be configured to support two 20 inch by 20 inch filters (either by one or more than one air filter mount 48). As another example, the filter housing 40 might be configured to support two or more filters in a stacked relationship. For example, as illustrated in FIG. 11, the filter housing 40 may define one or more slots or other supports for supporting multiple filters in a stacked relationship. In the embodiment which is illustrated, the filter housing 40 will support up to three filters 46A, 46B, 46C (though a user might use as few as one or two). Of course, the filter housing 40 might support additional or other numbers of filters. In this embodiment, the filters are supported to that there is a gap between them. However, they could be supported in a manner where they contact or rest upon one another. It will be noted that the filters might comprise any combination of a HEPA filter, a carbon or charcoal filter, a pre-filter, a standard filter, a poly-coated glass filter, etc., depending upon the desired application. For example, the bottom filter 46C might comprise a pre-filter, a middle filter 46B might comprise a standard filter or an odor trapping filter, while the top filter 46A might comprise a HEPA filter. While the bottom filter 46C might rest directly upon the filter housing grate or grill, as illustrated in FIG. 11, the bottom filter might be supported above the grill, thus facilitating less turbulent (and thus quieter) air flow and facilitating the use of an air pressure differential tube as detailed herein, for among other reasons.

Other filter retaining mechanisms may be used other than the mount 48 as described above. Preferably, however, the filter retaining mechanism secures the one or more air filters to the filter housing 40 so that the one or more filters move with the filter housing 40 when the filter housing is raised and lowered, and so that the position of the one or more air filters is maintained (such as to prevent, for example, the filter(s) from moving askew and blocking the filter housing 40 from being moved into its retracted position and ensuring that the filter(s) is properly located between the opening(s) 54 in the filter intake 40 and the air inlet 26). For example, clips or other types of mounts might be utilized to accomplish this task.

As indicated, in one embodiment, the filter housing 40 can selectively be locked or latched into its retracted position. Other mechanisms than the latch 70 described above might be utilized. For example, a latch with 1 arm or more than 2 arms (such as 4 arms extending 90 degrees to one another) might be used. Locks or latches which rotate, slide or otherwise move between locked and unlocked positions may be utilized. For example, a latch might be located along one or more sides of the filter housing 40. Such latches might be moved with various control tools. A particular advantage of the latch 70 of the present invention is that it is centrally controlled and thus may be actuated by the same control tool which a user utilizes to lower the filter housing 40 (it is possible for the invention to have a configuration in which one control tool is used to control the latch(es) 70 and another is used to control the position of the filter housing 40).

Various means may be used by a user to move the filter housing 40 from its retracted to its lowered position and thus the tool connector of the filter housing 40 and/or the control tool, may vary. As described above, in a preferred embodiment, the control tool comprises a mechanically actuated tool in the form of a pole having a threaded end. However, other tools or devices might be utilized, and such tools or devices might connect to the filter housing 40 in various manners. For example, the filter housing 40 might include a downwardly extending hook. A user might attach a weighted rod to the hook in order to pull the filter housing 40 downwardly and maintain it in its lowered position. The filter housing 40 might define a socket or other types of mounts for selectively accepting or mounting a control tool thereto.

While a cart or dolly 94 may be used to position the pole 86 and also maintain the pole 86 in a fixed position, other devices could be utilized. For example, the bottom of the pole 86 might be formed with or be connected to a simple weighted base. Also, in other configurations, the mounts 58 might have a lock-out position or the like, wherein at one or more positions the biasing mechanisms do not bias the cables 60 upwardly (such as catches which engage the pulleys at designed positions or the like, but which catches can be released when the user is ready to raise the filter housing 40 back to its raised position).

Figure 9:
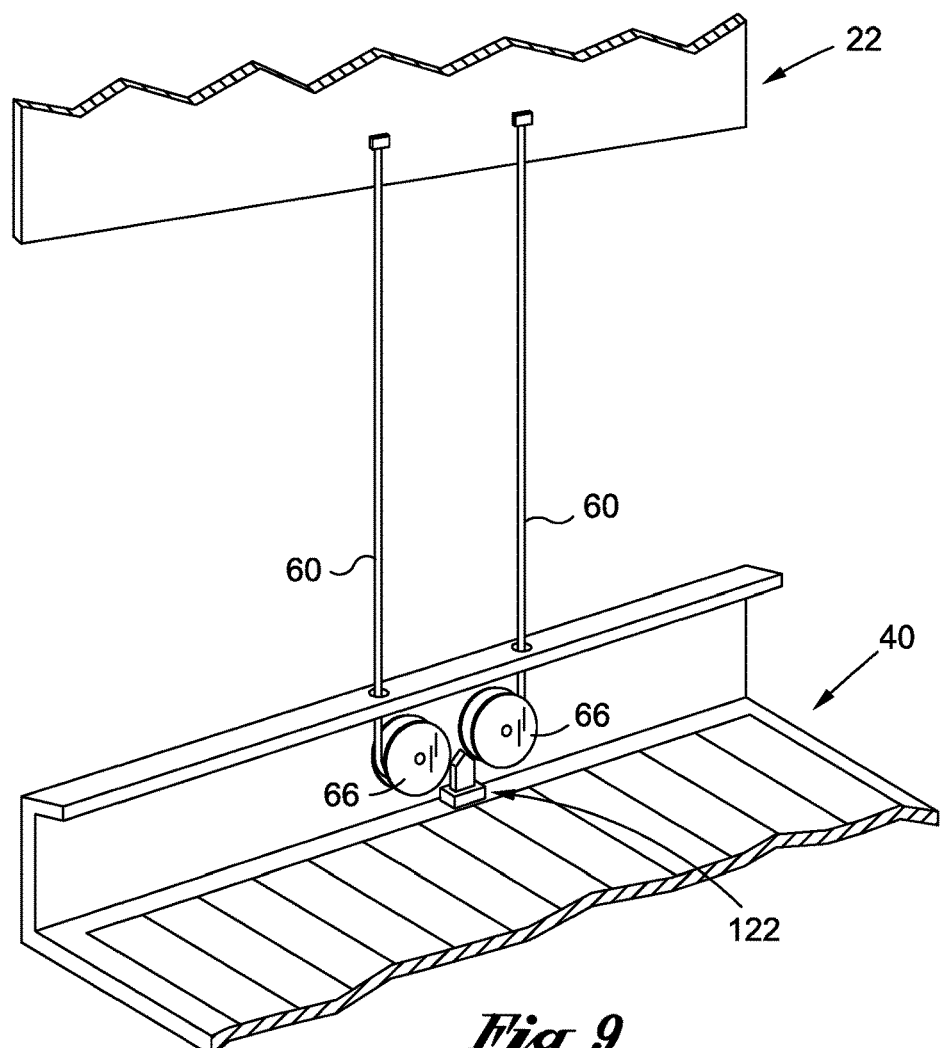
FIGS. 9 and 10 illustrate a braking mechanism in accordance with an embodiment of the invention.
Figure 10:
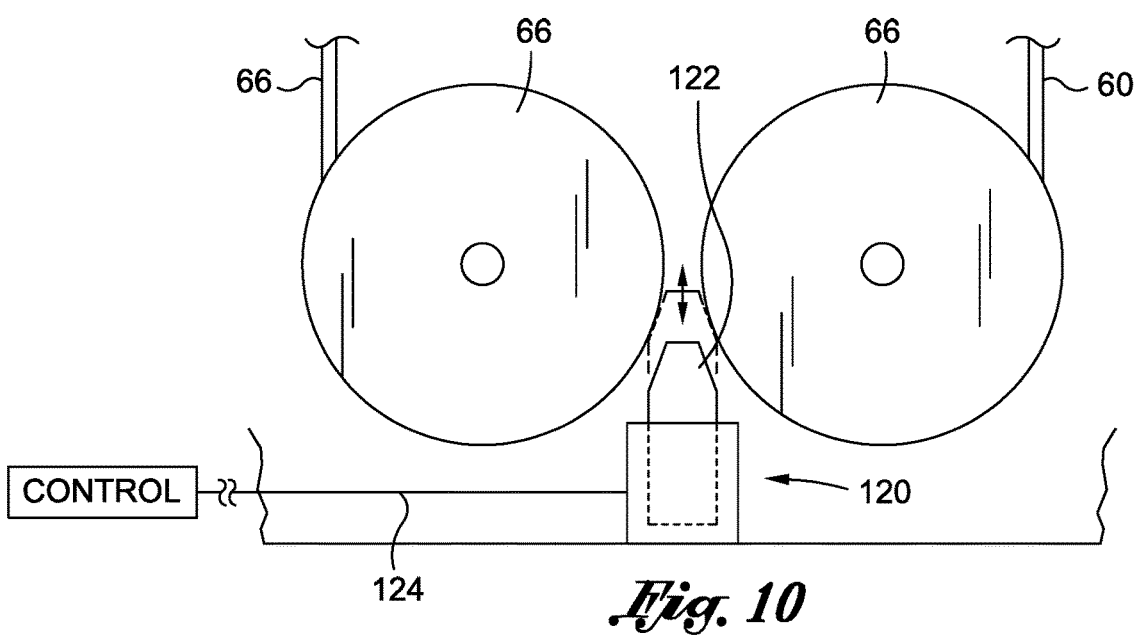

FIGS. 9 and 10 illustrate another embodiment of the invention. In this configuration, the means for movably connecting again comprise one or more cables 60 which are biased by one or more mounts, such as biased pulleys 66 (as illustrated, the pulleys 66 may be mounted in a channel portion of the air filter, such as to keep the pulleys out of the air flow path). In this configuration, however, the pulleys 66 are mounted to the air filter housing 40, with a first end of each cable 60 connected to or movable by the pulley, and a second end connected to the air return 24. Preferably, the pulleys 66 are configured to wind the cables 60, thus biasing the air filter housing 40 to its raised position. FIGS. 9 and 10 illustrate a configuration in which pairs of pulleys 66 and associated cables 60 are located at opposing sides of the filter housing 40 (although only one side of the filter housing 40 is illustrated in FIGS. 9 and 10). However, there could be a lesser or greater number of pulleys 66 and cables 60 and/or their position might vary (for example, there might be a single pulley 66 and associated cable 60 at two opposing sides of the filter housing 40). It will be appreciated that, while not shown, the pulleys 66 could be mounted in one or more housings or mounts (such as mounts 62 as described above).

In this configuration, the means for moving preferably includes one or more stops or a stop mechanism which are configured to prevent the pulleys 66 from winding the cables 60. As illustrated in FIGS. 9 and 10, the stop may comprise one or more brakes 120. The brake 120 is preferably configured to selectively prevent movement of one or all of the pulleys 66. In an embodiment such as is illustrated in FIGS. 9 and 10 where two pulleys 66 are mounted adjacent to one another, the brake 120 may comprise a pin 122 or similar member which can be moved between a first position in which it does not engage the pulleys 66, thus permitting them to rotate, and a second position in which it engages the pulleys 66, preventing them from rotating.

Preferably, the stop includes one or more controls for selectively engaging the stop, such as the brake 120. In one embodiment, the control may include a cable 124 which can be actuated by a user.

In one configuration, the cable 124 may extend from the brake 120 to the pivot 72 (see FIG. 4). The pin 122 of the brake 120 may be biased upwardly into the braking position, such as by one or more springs or other biasing mechanisms. The cable 124 may be connected to the pivot 72 so that then the user actuates the pivot 72 to unlock the latch 70, the user can also control the brake 120 by pulling the pin 122 downwardly into a release position. For example, the cable 124 may be connected to the pivot 72 so that when the user rotates the pivot 72 with a tool, such as the pole 86, the user also disengages the brake. This permits the user to unlock the latch 70 to release the air filter housing 40, and also release the brake 120 so that the user can pull the air filter housing 40 downwardly.

When the user has pulled the air filter housing 40 down to the desired position, the user can release the pole 86. At that time the brake 120 preferably automatically sets (such as by biasing the pin 122 upwardly). This causes the position of the air filter housing 40 to be fixed by the brake 120. The user may then replace, clean, or inspect the air filter, etc., while the air filter housing 40 is securely maintained in its lowered position.

When the user is done, the user can turn the pole 86, thus causing the control 124 to release the brake 120. At that time, the pulleys 66 wind the cables 60, thus causing the air filter housing 40 to move upwardly to its retracted position. The user may then release the pole 86, at which time the latch 70 again automatically moves to its locked position and the brake 120 automatically re-engages.

It is noted that in this configuration, the pole 86 or other tool need not be weighted because the weight of the pole 86 is not required to maintain the filter housing 40 in its lowered position.

As indicated, there may be more than one brake 120. For example, a brake 120 might be provided for each pulley 66. Also, the configuration of the brake 120 might vary from that described above. For example, each pulley 66 might comprise or include teeth which may be selectively engaged by a lever. The lever may be movable between a position in which it engages one of the teeth (locking or braking the pulley 66) and a position in which it does not engage the pulley (allowing the pulley 66 to rotate). In general, the one or more brakes preferably comprise one or more elements which allow a user to selectively prevent the means for moving from biasing or moving the filter housing 40 upwardly, thus allowing the user to selectively maintain the filter housing 40 in one or more desired lowered positions.

As indicated, the user can preferably control the one or more brakes via one or more controls. Preferably, the one or more brake controls are located at the filter housing 40. For example, it is possible for the one or more brakes 120 to be located at the air return 24, but have the brake control associated with the filter housing 40 (whereby when the filter housing 40 is lowered, the brake control at the filter housing 40 remotely controls the one or more brakes which are located up at the air return 24).

In one embodiment, the control can be actuated by the same tool which is used to control the latch 70 and/or raise and lower the filter housing 40. As indicated, in one embodiment the control is controlled by rotation of the pole 86 which also affect locking or unlocking of the latch 70.

However, the brake control could be actuated or controlled in other manners. For example, the brake control might be actuated by a tip of the pole 86 pressing upwardly, while locking and unlocking of the latch might be accomplished by rotating the pole. Of course, it is also possible for the one or more brakes 120 to be controlled with other tools or controls than those which are used to lock and unlock the latch 70 and raise and lower the filter housing 40. While the brake 120 and the associated control may be mechanical, in other embodiments they might be electro-mechanical in configuration. For example, the control might comprise a button which the user pushes which causes an electrical signal to be sent to a solenoid which selectively engages or disengages the brake.

In one embodiment of the invention, one or more indicators may be provided regarding a condition of the filter housing 40. For example, a visual indicator may be provided which indicates whether the latch 70 is locked or unlocked. As one example, when the latch 70 is located, a red indicator may be provided to the user and when the latch 70 is unlocked, a green indicator may be provided to the user. The indicators might comprise, for example, red and green dots which selectively align with a window in the filter housing 40, depending upon a position of the pivot 72. Likewise, a similar indicator might be provided to the user regarding a condition of the one or more brakes 120.

It is also possible for filter housing 40 to be raised and/or lowered by other types of tools other than the pole 86 described above. For example, each pulley 62 might be drivable by a tool, such as via rotation of a pole or a shaft of a power driven drill. The user might engage the tool with a socket and rotate the tool (pole, drill shaft) to cause the pulleys to wind or unwind (depending upon the direction of rotation). In this and other configurations, the mounts 58 may not be required to include a biasing mechanism for biasing the filter housing 40 upwardly, or the biasing force which is required may be lessened).

In another embodiment, the filter housing 40 might be raised and/or lowered by one or more motors. The one or more motors might be used to drive the pulleys 62. In the embodiment described above, the filter housing 40 must be pulled downwardly against the pulley bias which is necessary to raise the filter housing 40. In this embodiment, once unlocked, the pulleys 62 might freewheel, thus allowing the filter housing 40 to simply lower with the aid of gravity. Then the one or more motors may be utilized to rotate the pulleys 62 to raise the filter housing 40 upwardly.

In one embodiment, the one or more motors might by controlled by a remote control or via a switch which is provided near the filter housing 40, such as below the filter housing 40 on a wall of a home, building, etc., where the filter housing 40 installed.

In one embodiment, the filter housing 40 may be configured to be engaged and unlatched using a pole 86 or other tool having a single engaging feature. For example, referring to FIG. 5, the pole 86 might have a single threaded tip portion. The threaded portion 106 of the opening O and the tool mount 100 of the pivot 72 might be of the same size, whereby the threaded tip of the pole 86 is threaded upwardly into both openings. In yet another embodiment, the opening O might be enlarged so as to permit the pole to be extended there though. Once the pole 86 is engaged with the pivot 72, the pole 86 can be used to both unlatch the latch 70 (by turning the pole 86), to move the filter housing 40 (by pulling down on the pole 86, since the pole is engaged with the pivot 72, which is in turn mounted to the filter housing 40), and to control the one or more brakes 120.

One problem with existing air returns 22 is that they are box-shaped and have abrupt corners, such as walls and a top portion which meet at 90 degree angles. As one aspect of the invention, a user might install an air return 22 having smooth transitions between the surfaces thereof, such as illustrated in FIG. 2. This air return 22 might be installed as part of a new installation (instead of an existing square box return) or it might be inserted into an existing box-shaped air return. For example, the bracket 110 might have a top air return or sleeve portion 112 which fits into and supersedes the existing air return 22 (for example, referring to FIG. 8, a top portion of the bracket 110 might taper to a duct or tube which is configured to extend all the way into an existing outlet of the existing air return 22). In this manner, additional benefits (a quieter system) may be realized in addition to the filter access benefits described herein. In one embodiment, the bracket 110, the adapter 130 and/or the return 24 might be vacuum formed (such as from plastic or another polymer) to have a smooth surfaces and smooth radius transitions between sections at different angles, thus facilitating less turbulent (and quieter) air flow).

In one embodiment, the filter system of the invention may include a filter status indicator. This feature has particular applicability to the filter housing 40 of the present invention, but might be used with other filter supports or housings, including those of a more traditional style.

Figure 13:
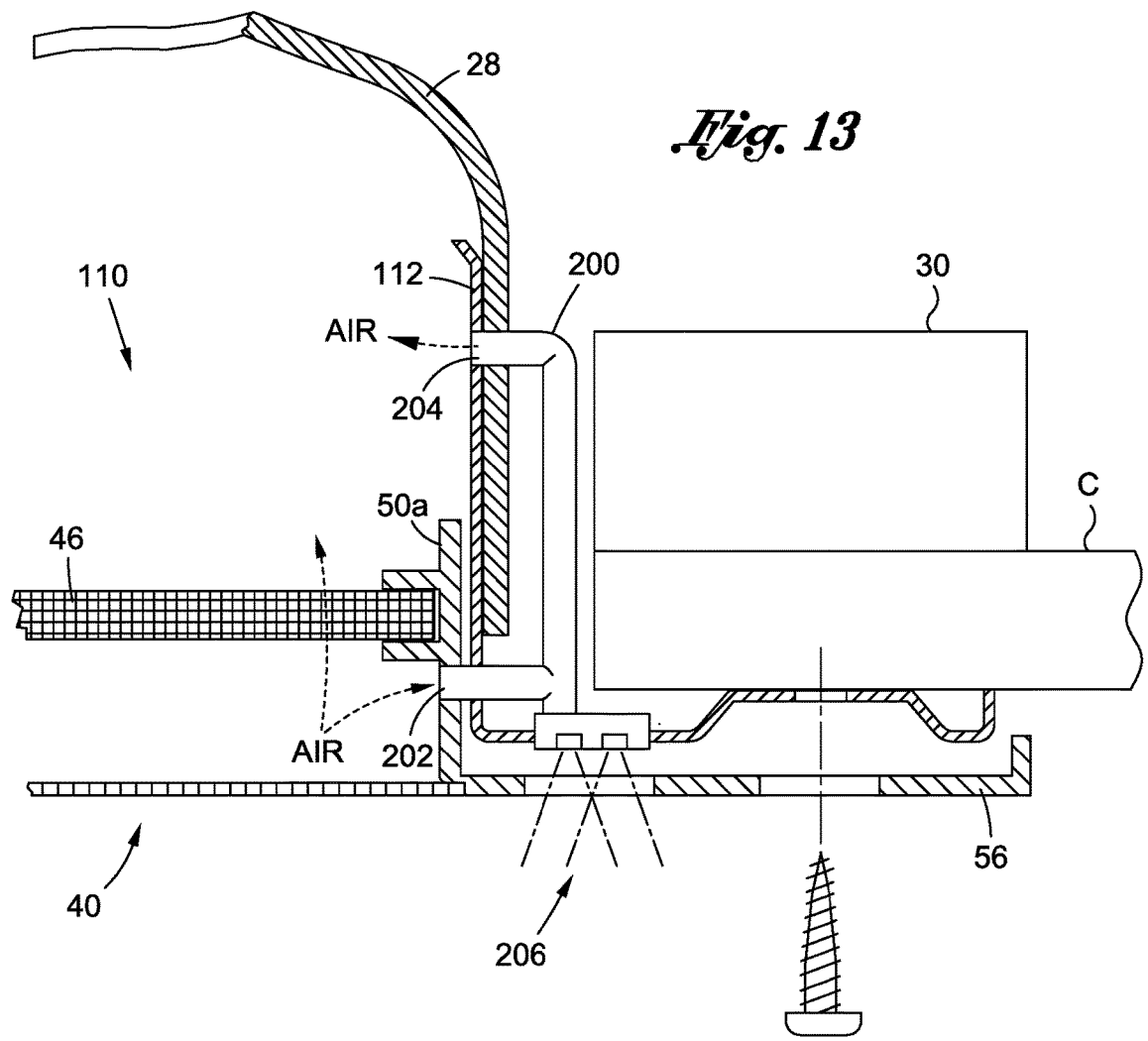
FIG. 13 illustrates a filter housing having a filter change indicator in accordance with the present invention.

FIG. 13 illustrates a filter housing 40 which is similar to that illustrated in FIG. 8A and described above. In this embodiment, the filter housing 40 defines or includes at least one air flow passage or pitot tube 200. The air pitot tube 200 has an inlet 202 and an outlet 204. In this embodiment, the inlet 202 is preferably positioned at the intake or exterior side of the filter housing 40 (e.g. coupled to the "ambient" air), such as before the air passes through the first (or only) filter 46. The outlet 204 is preferably positioned at the downstream side of the filter housing 40, such as after the air passes through the last (or only) filter 46 (e.g. at the interior side along the path to the blower). The air pitot tube 200 preferably comprises a tube, passage or the like through which air may freely flow.

The air pitot tube 200 may be configured in various fashions. As illustrated, the inlet 202 aligns with or extends through an opening in the filter support flange 50a (see also FIGS. 3 and 11). The outlet 204 aligns with or extends through an opening in the air return or sleeve portion 112 of the filter housing 40. As illustrated, the air pitot tube 200 runs along the outside of the bracket 110, such as between the filter housing 40 and the associated support structure (such as the ceiling C, etc.). Of course, the air pitot tube 200 might be formed as part of one or more components of the filter housing 40, such as where the air pitot tube 200 comprises a passage through one or more of those components.

The air pitot tube 200 is configured to provide an indication of the status of the one or more air filters 46. In particular, when the air filters are clean, air will flow through the filters 46 at a high rate. The air flow rate through the air pitot tube 200 will then be low (and the differential pressure between the inlet and outlet ends of the tube 200 will be low). However, as the filters get clogged, the air will flow through the filters 46 at a lower rate. The air flow rate through the air pitot tube 200 will then rise, as will the differential pressure through the tube 200.

Figure 14:
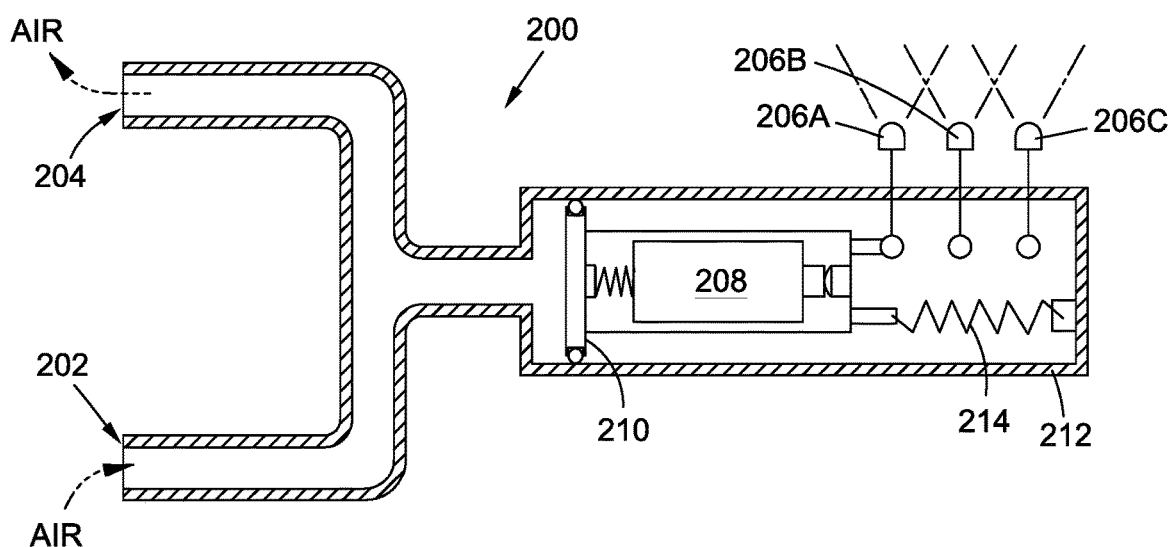
FIG. 14 illustrates detailed of a filter change indicator in accordance with an embodiment of the invention.

In one embodiment, means are provided for indicating a status of the air filters, preferably based upon the air flow through the pitot tube 200. In one embodiment, this comprises at least one visual indicator 206 and a means for controlling the visual indicator. In one embodiment, the mechanism may be very simple: the visual indicator 206 may comprise one or more lights, such as two or more lights. Based upon the air flow/pressure in the pitot tube 200, a circuit contact may close a circuit between a power source (such as one or more batteries) and either the first light or the second light, etc. For example, as illustrated in FIG. 14, a battery 208 might be mounted on a moving plunger 210 which is mounted in a housing 212. An interior space of the housing 212 is linked to the pitot tube 200. The position of the plunger 210 may change based upon the air flow/pressure in the pitot tube 200 (as illustrated, the plunger 210 may be biased to a first position, such as a "clean filter" position, such as by one or more springs 214, and wherein the plunger moves rearwardly as the air flow and pressure in the pitot tube 200 increase), wherein in a first plunger position the battery may be part of a closed circuit that lights a first light 206, but when the plunger moves to a second position the battery may then be part of a closed circuit that lights a second light 206B (and there might be a third light 206C, fourth light, etc.). In this manner, changes in air flow/pressure in the pitot tube 200 cause one more members to move, wherein the position of the one or more members determines which visual indicator is illuminated.

In one embodiment, the visual indicator 206 might comprise, for example, a first green light, a second yellow light and a third red light, or an LED which is capable of generating light of those colors. In this embodiment, the first green light might be illuminated when the air flow/pressure associated with the air pitot tube 200 is low (air filters are clean), a second yellow light might be illuminated when the air flow/pressure associated with the air pitot tube 200 is medium (air filters are between clean and dirty) and a third red light might be illuminated when the air flow/pressure associated with the air pitot tube 200 is high (air filters are dirty).

Of course, other configurations are possible. For example, in one embodiment the filter status indicator might include a controller. The controller might receive input from an air sensor (such as an air pressure or air flow sensor) or other element (such as based upon the position of a moving plunger). The controller might then be configured to control the activation of one or more lights, such as the above-referenced green, yellow and red lights, or to control the color output of a single multi-color LED. Further, the air passage(s) and sensors could have other configurations, such as where differential pressure is determined by measuring total pressure on the interior side and static pressure on the exterior side of the air filter(s) and then determining the differential therefrom, in which case one air passage might lead to the sensor from the exterior side and another from the interior side.

Of course, in the configuration in which the filter indicator includes one or more lights, the filter indicator has or is powered by one or more power sources. The power source might comprise one or more batteries, coupling to an external power supply, etc.

Preferably, the filter indicator is visible to the user of the filter housing 40 when the filter housing 40 is in its raised position. For example, as illustrated in FIG. 13, the visual indicator 206 might be visible through an opening in the filter housing grate, such as the flange 56 thereof. In another embodiment, the visual indicator 206 is aligned with the control tool opening O (see FIG. 5), whereby when the control tool is not located in the opening, the user can look up and see the condition of the filter(s) by viewing the visual indicator through the opening O.

In one embodiment, the filter indicator may be associated with the filter housing 40 in a manner which allows it to be raised and lowered therewith. For example, the air passages may comprise tubes which are supported by the filter housing rather than being passages located in the surrounding support structure or ceiling. As one example, one or more tubes which define the air passage(s) of the filter indicator might be mounted to or be formed as a portion of the filter mount 50. One or more tubes or passages may have an opening in the grate or other location below the filter(s) 46, and one or more tubes or passages may have an opening above the filters 46. In the case of a battery powered indicator, this allows the filter indicator to be lowered downwardly with the filter housing to that the user can easily access and replace the batteries. Further, in this configuration, the filter housing 40 with the filter indicator comprises a single unit which can simply be mounted or installed as noted above without having to modify the surrounding support structure or ceiling to include the filter indicator features.

The invention has a plurality of distinct advantages over the prior art. First, in accordance with the invention, the position of an air filter can be changed from a raised, use position to a lowered, access position. Movement of the air filter can be accomplished by simply connecting a tool to an associated filter housing and lowering the filter housing.

This feature eliminates the need for the user to use a ladder to access the air filter housing and the enclosed filter in the case of existing HVAC systems with air intakes which are located in the ceiling. Thus, a user does not risk falling off of a ladder and injuring themselves.

Another advantage of the system is that once the filter housing is lowered, the control tool (such as the pole and dolly) can be used to restrain the filter housing during filter replacement or the one or more brakes may be used to restrain the filter housing. This frees the user to use both of their hands to remove and replace the air filter (because the user does not need to hold onto the filter housing to maintain it in its lowered position or to fix the position of the filter housing to keep it from swaying).

One advantage to the control arrangement of the invention, including the control tool, is that in order for the tool to unlatch the latch 70 and one or more brakes 120, it must be fully engaged with the filter housing 40. Thus, if the latch 70 is successfully unlatched and the one or more brakes 120 are successfully disengaged, a user is assured that the tool is engaged and that they can then pull downwardly on the filter housing 40 to lower it (thus eliminating the risk that the user does not sufficiently connect the tool and upon pulling the filter housing 40 down, the tool comes loose (although in the preferred embodiment, in such a configuration the one or more brakes 120 are also then not disengaged and the filter housing 40 is also prevented from abruptly raising back up).

Another advantage of the system is that when the filter housing is raised, it can be securely locked or latched. This ensures that the movable filter housing is retained during operation of the HVAC system. Most preferably, however, the locking or latching system can be actuated by a user from the ground (i.e. without climbing a ladder).

Yet another advantage of the invention is that the components of the filter housing 40, including the movable supports 58, are not located in the air flow path through the air intake 20. Thus, air flow is not impeded or interfered with and those components are less likely to become fouled with dirt. This contrasts with some existing systems where motors, balancers or the like are located inside of the air return 22 directly in the air flow path, thus impeding air flow, causing the components to become dirty, and introducing noise and vibration as a result of the movement of air over the components.

Another advantage of the invention is that an existing air intake with a swinging or hinged grate of the prior art can easily be modified to provide the filter access features of the present invention. As described above, one benefit to the invention is its simplistic design, thus permitting a movable filter housing to be connected to an existing air intake.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. An air filter unit for an air heating/cooling system having an air intake located in a ceiling, the air intake comprising an air return having an air inlet, comprising:
   a filter housing comprising an air intake grate having an outer side and an inner side, a plurality of air filter mounts located at said inner side and spaced from said inner side of said grate and from one another for supporting at least two air filters in a spaced, vertically stacked relationship above said inner side of said grate, whereby air drawn by said air heating/cooling system flows upwardly through said intake grate at said air inlet, through each of said at least two air filters in sequence and then to said air return.

2. The air filter unit in accordance with claim 1 wherein said filter housing is movably mounted relative to said air intake, whereby said air filter housing and said associated air filters are movable relative to said air intake to permit access to said air filters.

3. The air filter unit in accordance with claim 2 wherein said filter housing is configured to be moved between a raised position in which said filter housing is located at said air inlet and a lowered position where said air filter housing is located below said air inlet.

4. The air filter unit in accordance with claim 1 wherein said filter mounts each comprise a slot for receiving a single air filter.

5. The air filter unit in accordance with claim 4 wherein said slots extend generally parallel to said air intake grate, whereby said air filters are movable into and out of said slots in a generally horizontal direction.

6. The air filter unit in accordance with claim 1 further comprising at least one air filter condition indicator.

7. The air filter unit in accordance with claim 6 wherein said indicator comprises a first upstream air passage configured to receive said air before passing through said air filters and a second downstream air passage configured to receive said air after passing through at least one of said air filters, at least one air pressure sensor associated with said air passages and at least one indicator which provides an output based upon said output of said air pressure sensor.

8. The air filter units in accordance with claim 7 wherein said first and second air passages each comprise a pitot tube and said at least one indicator comprises at least one light.

9. The air filter unit in accordance with claim 8 wherein a color of said at least one light changes depending upon said output of said air pressure.

* * * * *